United States Patent
Shi et al.

(10) Patent No.: US 10,722,063 B2
(45) Date of Patent: Jul. 28, 2020

(54) MULTIFUNCTIONAL POT

(71) Applicant: Ningbo Jinyu Electric Appliance Co., Ltd., Yuyao (CN)

(72) Inventors: Junda Shi, Yuyao (CN); Zhongyu Shi, Yuyao (CN); Shukuo Liu, Yuyao (CN); Bingxiong Li, Yuyao (CN)

(73) Assignee: Ningbo Jinyu Electric Appliance Co., Ltd., Yuyao (CN)

( * ) Notice: Subject to any disclaimer, the term of this patent is extended or adjusted under 35 U.S.C. 154(b) by 314 days.

(21) Appl. No.: 15/816,116

(22) Filed: Nov. 17, 2017

(65) Prior Publication Data

US 2019/0082876 A1 Mar. 21, 2019

(30) Foreign Application Priority Data

Sep. 19, 2017 (CN) .......................... 2017 1 0843718

(51) Int. Cl.
*A47J 27/00* (2006.01)
*A47J 36/32* (2006.01)
*H05B 3/68* (2006.01)

(52) U.S. Cl.
CPC ............. *A47J 27/004* (2013.01); *A47J 36/32* (2013.01); *H05B 3/68* (2013.01)

(58) Field of Classification Search
CPC .................................................... A47J 27/004
USPC ......................................................... 219/438
See application file for complete search history.

(56) References Cited

U.S. PATENT DOCUMENTS

| | | | | |
|---|---|---|---|---|
| 4,307,287 A | * | 12/1981 | Weiss ...................... | F24C 7/087 219/442 |
| 6,232,577 B1 | * | 5/2001 | Reiff ....................... | F02N 19/02 123/142.5 R |
| 2011/0209307 A1 | * | 9/2011 | Castey Dominguez | ..................... A47J 45/08 16/431 |
| 2015/0020693 A1 | * | 1/2015 | French .................... | A47J 27/12 99/340 |
| 2015/0201787 A1 | * | 7/2015 | Holzbauer ............ | A47J 43/046 99/348 |

* cited by examiner

*Primary Examiner* — Lauren A Crane
(74) *Attorney, Agent, or Firm* — Wood Herron & Evans LLP (57) ABSTRACT

The present invention discloses a multifunctional pot. The multifunctional pot includes a shell, a heating element heat-conducting tray and a pot body, with a liner provided inside the shell. Since the heating element heat-conducting tray of the multifunctional pot performs direct heating, the pot body is heated uniformly. Moreover, the inner wall of the heating element heat-conducting tray can be tightly fitted to the outer wall of the pot body, so that most heat is conducted to the pot body. In addition, the liner can effectively insulate the heat generated by heating elements from being transferred to the outside, so that any wasted heat loss is reduced and the energy utilization rate is high.

9 Claims, 7 Drawing Sheets

MULTIFUNCTIONAL POT

CROSS-REFERENCE TO RELATED APPLICATION

This application claims priority to Chinese Application No. 201710843718.0, filed 19 Sep. 2017, with a title of MULTIFUNCTIONAL POT. The above-mentioned patent application is incorporated herein by reference in its entirety.

TECHNICAL FIELD

The present invention relates to the technical field of kitchen utensils and, in particular, to a multifunctional pot.

BACKGROUND

Multifunctional pots are modern kitchen utensils capable of realizing various processing modes such as frying, stir-frying, steaming and boiling, and each function generally has at least two gears, so that diverse requirements of a user can be fulfilled and it greatly facilitates people's life. An existing multifunctional pot generally has a shell and a pot body. For some multifunctional pots, cooking is realized by directly heating the pot body by a heater, but it is likely to result in the uneven heating of the pot body in this case. Or, a heat conducting liner is further provided between the shell and the pot body, and a heater is provided on an outer wall of the liner. In this case, although the problem of the uneven heating of the pot body is overcome, most of the heat from the heater will be dissipated to the surrounding through the shell since the heater is provided between the heat conducting liner and the shell. Accordingly, the heat loss is high, the energy utilization rate is low, and the operating efficiency is low. Moreover, the temperature of the shell is high, and it is thus less safe.

SUMMARY

An objective of the present invention is to provide a multifunctional pot to solve the problems in the prior art, improve the energy utilization rate of a multifunctional pot and ensure the even heating of food to be cooked.

For this purpose, the present invention provides the following solutions.

The present invention provides a multifunctional pot, including a shell, a heating element heat-conducting tray and a pot body, wherein a liner is provided within the shell, and an upper end of the shell is connected to an upper end of the liner; the heating element heat-conducting tray is disposed inside the liner, and the height of the heating element heat-conducting tray is less than the depth of the liner; a bottom heating element for heating the bottom of the heating element heat-conducting tray is provided on an outer bottom surface of the heating element heat-conducting tray; an annular heating element for heating a side wall of the heating element heat-conducting tray is provided on an outer side wall of the heating element heat-conducting tray; the bottom heating element and the annular heating element are connected in parallel and electrically connected to an operating circuit of the multifunctional pot; the pot body for containing food to be cooked is placed on the heating element heat-conducting tray; and, an inner wall of the heating element heat-conducting tray is fitted to an outer wall of the pot body, and the height of the pot body is greater than the depth of the heating element heat-conducting tray.

Preferably, the operating circuit of the multifunctional pot is further electrically connected with a safety switch, and the safety switch is connected in series to the bottom heating element and the annular heating element which are connected in parallel.

Preferably, a temperature measurement device for measuring the temperature of the pot body is provided between the heating element heat-conducting tray and the liner; the safety switch is disposed on an inner bottom surface of the liner below the temperature measurement device; the temperature measurement device is connected to the inner bottom surface of the liner via an elastic resetting element, and an upper end of the temperature measurement device passes through and extends out from the heating element heat-conducting tray; when the pot body is placed into the heating element heat-conducting tray and comes into contact with the inner bottom surface of the heating element heat-conducting tray, the pot body pushes down the temperature measurement device and moves down the temperature measurement device to come into contact with the safety switch so as to turn on the safety switch.

Preferably, a temperature measurement through hole is provided on the bottom of the heating element heat-conducting tray; the temperature measurement device includes a limiting cover; a limiting portion is provided on an outer wall of the limiting cover; the elastic resetting element is disposed within the limiting cover and is in a compressed state; an upper end of the elastic resetting element is resisted against an inner top surface of the limiting cover, while a lower end thereof is resisted against the inner bottom surface of the liner; a thermometer which is located inside the elastic resetting element is fixedly connected within the limiting cover; an upper end of the thermometer passes through the limiting cover and is able to come into contact with the pot body; due to an elastic force of the elastic resetting element, the limiting cover passes through the temperature measurement through hole from the underneath of the heating element heat-conducting tray; and, the limiting portion is used for limiting the height of the temperature measurement device extending out from the heating element heat-conducting tray, and the limiting portion is unable to pass through the temperature measurement through hole.

Preferably, the safety switch is a contact switch, and a contact switch iron sheet is provided on the lower bottom surface of the thermometer; when the pot body is placed into the heating element heat-conducting tray and contacts the inner bottom surface of the heating element heat-conducting tray, the contact switch iron sheet contacts the safety switch so as to turn on the safety switch.

Preferably, the multifunctional pot further includes a controller to which the temperature measurement device is communicatively connected; and the controller is communicatively connected to the bottom heating element and the annular heating element, respectively, and can control the on and off the bottom heating element and the annular heating element.

Preferably, a circumferential groove for accommodating the annular heating element is provided on the outer side wall of the heating element heat-conducting tray in a circumferential direction; the annular heating element includes a heating tape wrapped by a silicone rubber strip; and the heating tape is disposed within the circumferential groove, and two ends of the heating tape are connected via a tension spring.

Preferably, the bottom heating element includes a heating tube; a middle portion of the heating tube is distributed on the outer bottom surface of the heating element heat-conducting tray in an S-shape, also referred to as a snake-like shape; on a lengthwise side of the heating element heat-conducting tray, two ends of the heating tube extend relatively to the middle portion of the heating element heat-conducting tray in the lengthwise direction of the heating element heat-conducting tray; a clamping groove matched with the distribution shape of the heating tube is provided on the outer bottom surface of the heating element heat-conducting tray; the heating tube is clamped within the clamping groove; the heating tube is connected in series to a current limiting resistor; and a circumferential edge of the bottom of the heating element heat-conducting tray is hollow.

Preferably, the multifunctional pot further includes a lid; the shape of the lid is matched with an opening of the pot body; an observation hole is formed on the lid; a transparent glass cover for closing the observation hole is provided on the observation hole; a shell handle is provided on a side wall of the shell; a handgrip wrapped by a silicone rubber insulating sleeve is externally provided on an upper edge of the pot body.

Preferably, an upper end face of the thermometer is flush with an upper end face of the limiting cover; the pot body is an aluminum pot, the liner is an aluminum liner, the heating element heat-conducting tray is an aluminum alloy heat-conducting tray, and the thermometer is an NTC (negative temperature coefficient) thermometer; and, a plurality of struts is provided on the outer bottom surface of the heating element heat-conducting tray, and the struts are connected to the liner via bolts.

Compared with conventional designs, the present invention has the following technical effects and achieves the following benefits.

The multifunctional pot of the present invention includes a heating element heat-conducting tray, and a bottom heating element for heating the bottom of the heating element heat-conducting tray and an annular heating element for heating a side wall of the heating element heat-conducting tray are provided on an outer wall of the heating element heat-conducting tray. Since the heating element heat-conducting tray is directly heated by the bottom heating element and the annular heating element and the heating element heat-conducting tray is a heat conductor, the heat can be transferred to the pot body in contact with the heating element heat-conducting tray, and the pot body is heated evenly. Accordingly, the uneven heating of the pot body when the pot body is directly heated by the heating elements can be prevented effectively. Since the liner disposed between the shell and the heating element heat-conducting tray is used for supporting the heating element heat-conducting tray and the pot body and can effectively prevent the heat from the bottom heating element and the annular heating element from being transferred to the outside, the heat generated by the bottom heating element and the annular heating element is mainly used to heat the heating element heat-conducting tray. Accordingly, the heat transferred to the shell and the atmosphere is decreased, and the heat dissipation is reduced. Furthermore, the temperature of the shell can be kept within a low range, and the safety is thus higher. Meanwhile, since the height of the heating element heat-conducting tray is less than the depth of the liner and the height of the pot body is greater than the depth of the heating element heat-conducting tray, the pot body can be conveniently taken out from the heating element heat-conducting tray. Therefore, the inner wall of the heating element heat-conducting tray can be designed to be fitted to the outer wall of the pot body, so that the heating element heat-conducting tray can transfer most of the heat to the pot body. Accordingly, the heat transfer rate is high, the heat loss is reduced, and the energy utilization rate is high.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

REFERENCE LIST

100: shell
110: shell handle
200: heating element heat-conducting tray
210: bottom heating element
211: heating tube
212: current limiting resistor
213: clamping groove
220: annular heating element
221: heating tape
222: silicone rubber strip
223: tension spring
240: strut
300: pot body
310: handgrip
311: silicone rubber insulating sleeve
400: liner
500: safety switch
510: contact switch iron sheet
600: temperature measurement device
610: elastic resetting element
620: limiting cover
621: limiting portion
630: thermometer
700: lid
710: transparent glass cover
720: lid handgrip
800: power panel
900: control panel
910: LED screen

DETAILED DESCRIPTION

The technical solutions in the embodiments of the present invention will be described below with reference to the accompanying drawings in the embodiments of the present invention. The embodiments described herein are merely a part but not all the embodiments of the present invention. All other embodiments obtained by a person of ordinary skill in the art without paying any creative effort based on the embodiments in the present invention shall fall into the protection scope of the present invention.

An objective of the present invention is to provide a multifunctional pot to solve the problems in the prior art, improve the energy utilization rate of a multifunctional pot and ensure the even heating of food to be cooked.

To make the objectives, features and advantages of the present invention comprehensible, the present invention will be further described below in detail by specific implementations with reference to the accompanying drawings.

The present invention provides a multifunctional pot, as shown in FIGS. 1-7, including a shell 100, a heating element heat-conducting tray 200 and a pot body 300, wherein a liner 400 is provided within the shell 100, and an upper end of the shell 100 is connected to an upper end of the liner 400; the heating element heat-conducting tray 200 is disposed inside the liner 400, and the height of the heating element heat-conducting tray 200 is less than the depth of the liner 400; a bottom heating element 210 for heating the bottom of the heating element heat-conducting tray 200 is provided on an outer bottom surface of the heating element heat-conducting tray 200; an annular heating element 220 for heating a side wall of the heating element heat-conducting tray 200 is provided on an outer side wall of the heating element heat-conducting tray 200; the bottom heating element 210 and the annular heating element 220 are connected in parallel and electrically connected to an operating circuit of the multifunctional pot; the pot body 300 for containing food to be cooked is placed on the heating element heat-conducting tray 200; an inner wall of the heating element heat-conducting tray 200 is fitted to an outer wall of the pot body 300, and the height of the pot body 300 is greater than the depth of the heating element heat-conducting tray 200.

In a conventional multifunctional pot, the height of the liner for transferring heat is generally comparable to the height of the pot body and the liner is arranged adjacent to the shell, and the heater or heating element on the outer wall of the shell is very close to the outer wall, so that most of the heat generated by the heater or heating element is transferred from the liner to the shell and dissipated in the atmosphere and the heat loss is thus high. Moreover, in order to conveniently take out the pot body, a large gap is generally provided between the pot body and the liner, so that the efficiency of the heat transfer from the liner to the pot body is low and the energy consumption is high.

Figure 1:
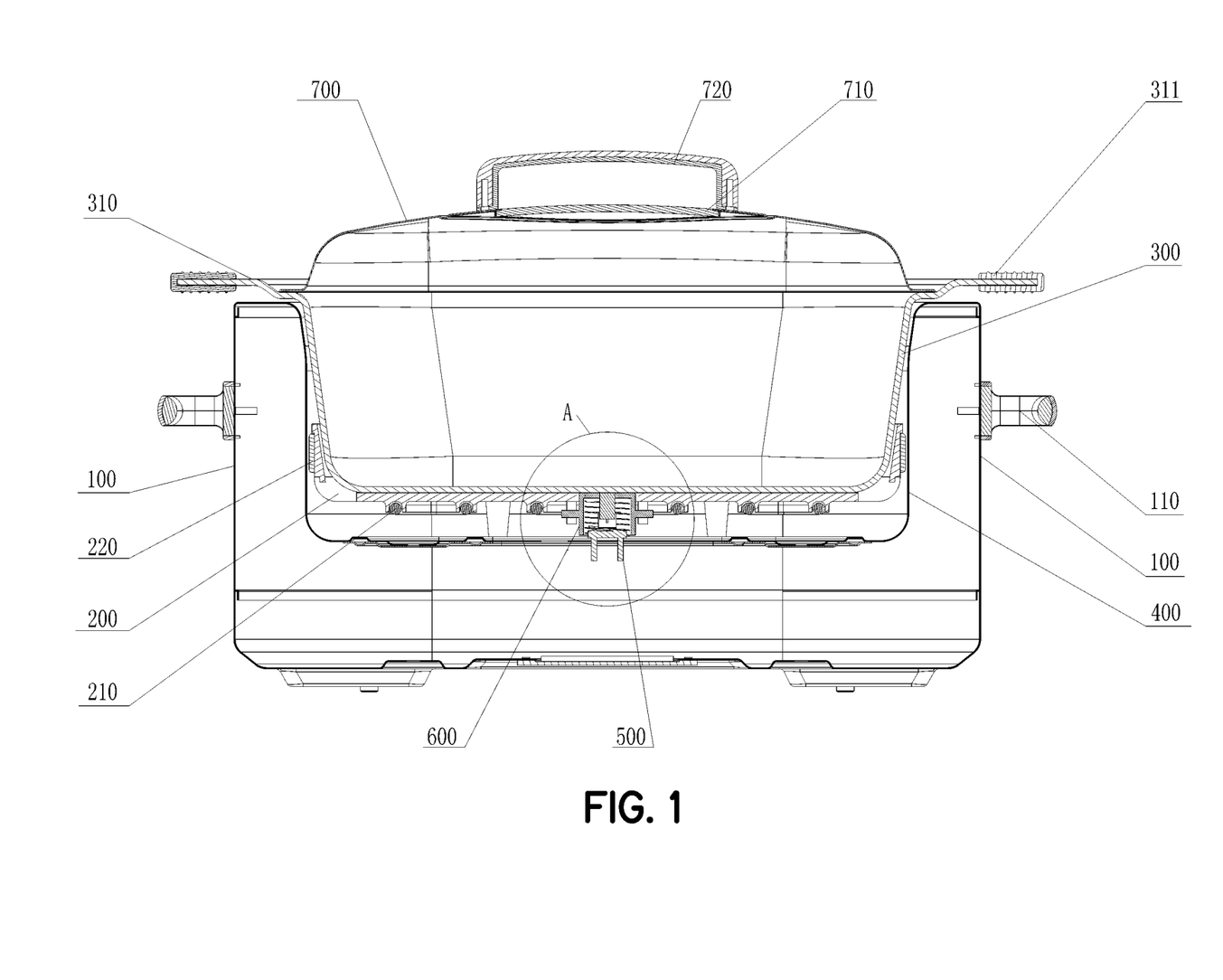
FIG. 1 is a schematic cross-sectional front view of a multifunctional pot according to one embodiment of the invention.
Figure 2:
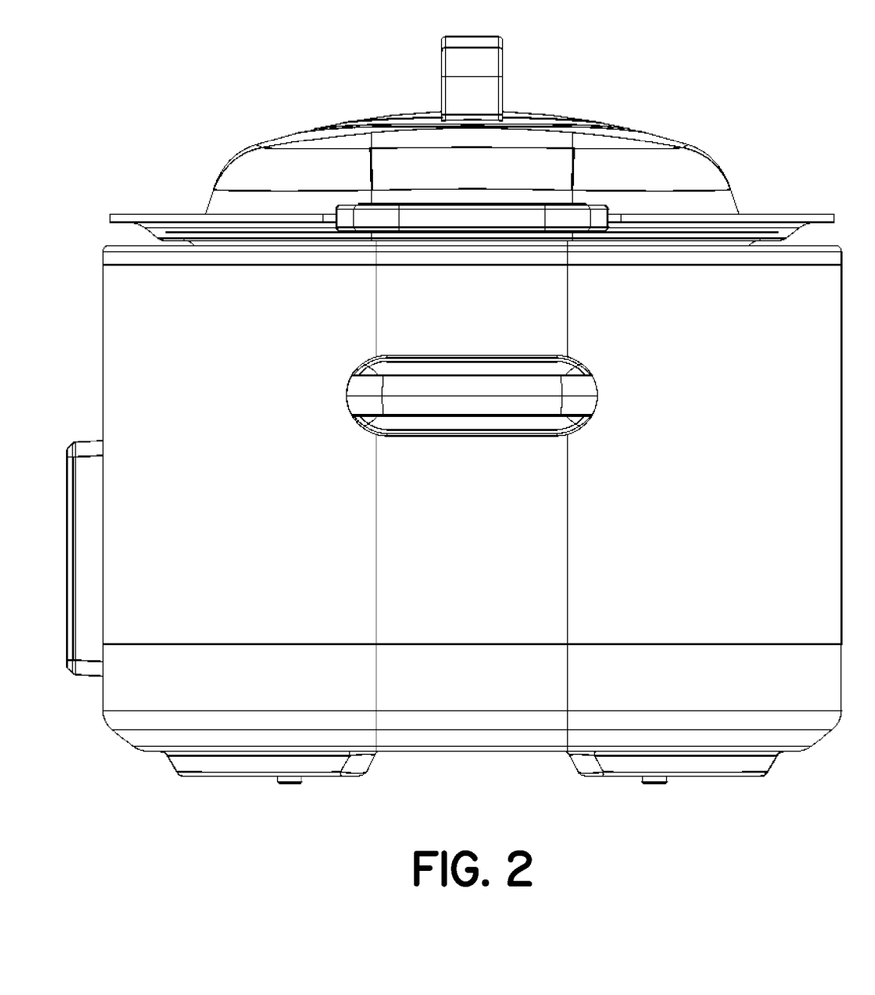
FIG. 2 is a left view of the multifunctional pot of FIG. 1.
Figure 3:
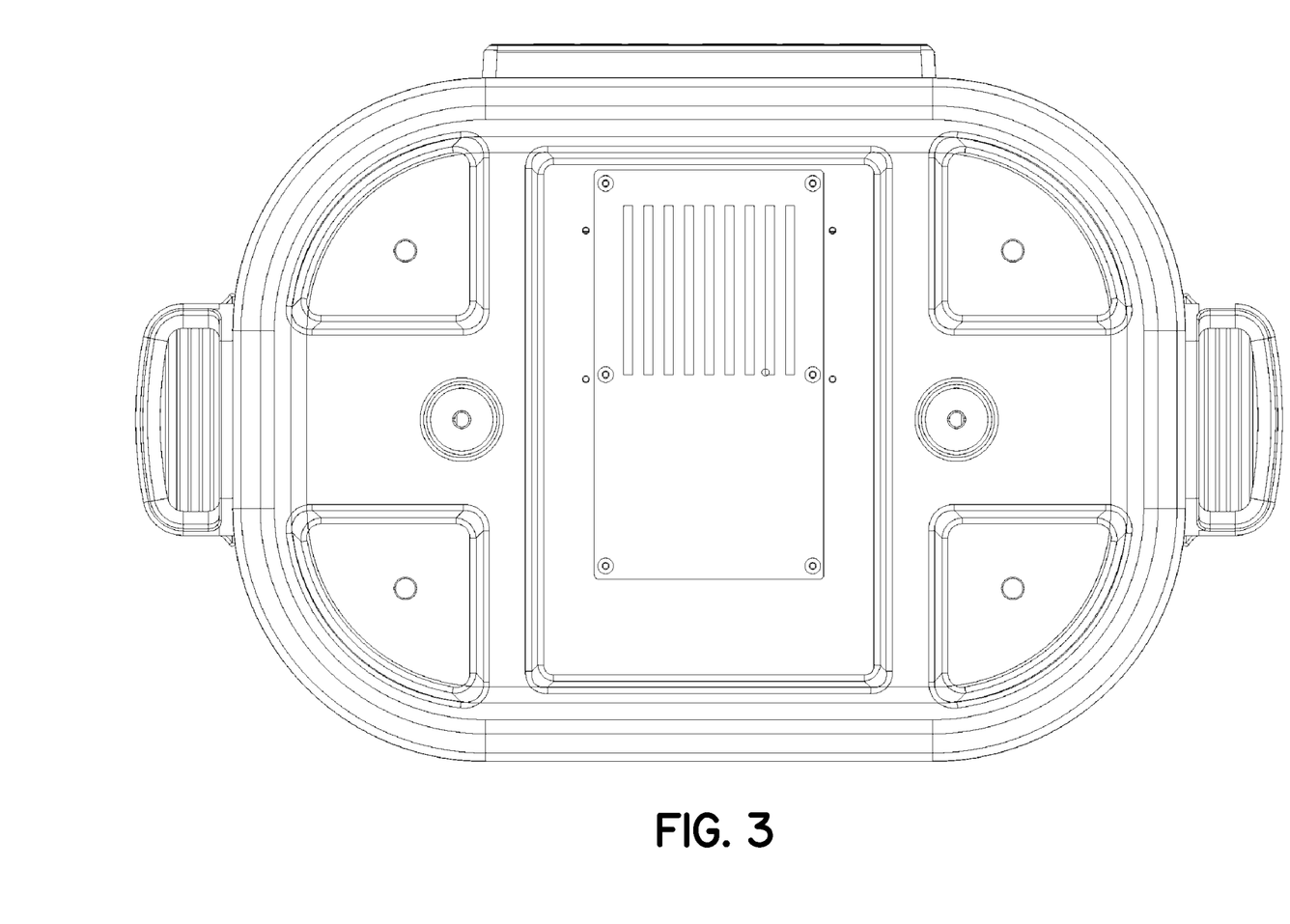
FIG. 3 is a bottom view of the multifunctional pot of FIG. 1.

The multifunctional pot in this embodiment includes a heating element heat-conducting tray 200, and a bottom heating element 210 for heating the bottom of the heating element heat-conducting tray 200 and an annular heating element 220 for heating a side wall of the heating element heat-conducting tray 200 are provided on an outer wall of the heating element heat-conducting tray 200. Since the heating element heat-conducting tray 200 is directly heated by the bottom heating element 210 and the annular heating element 220 and the heating element heat-conducting tray 200 is a heat conductor, the heat can be transferred to the pot body 300 in contact with the heating element heat-conducting tray, and the pot body 300 is heated evenly. Accordingly, the uneven heating of the pot body 300 when the pot body 300 is directly heated by the heating elements can be prevented effectively. Since the liner 400 disposed between the shell 100 and the heating element heat-conducting tray 200 is used for supporting the heating element heat-conducting tray 200 and the pot body 300 and can effectively prevent the heat from the bottom heating element 210 and the annular heating element 220 from being transferred to the outside, the heat generated by the bottom heating element 210 and the annular heating element 220 is mainly used to heat the heating element heat-conducting tray 200. Accordingly, the heat transferred to the shell 100 and the atmosphere is decreased, and the heat dissipation is reduced; furthermore, the temperature of the shell 100 can be kept within a low range, and the safety is thus higher. Meanwhile, since the height of the heating element heat-conducting tray 200 is less than the depth of the liner 400 (preferably, the height of the heating element heat-conducting tray 200 is not greater than ⅓ of the depth of the liner 400), and the height of the pot body 300 is greater than the depth of the heating element heat-conducting tray 200 (preferably, the depth of the heating element heat-conducting tray 200 is not greater than ¼ of the height of the pot body 300), the pot body 300 can be conveniently taken out from the heating element heat-conducting tray 200. Therefore, the inner wall of the heating element heat-conducting tray 200 can be designed to be fitted to the outer wall of the pot body 300, so that the heating element heat-conducting tray 200 can transfer most of the heat to the pot body 300. Consequently, the heat transfer rate is high, the heat loss is reduced, and the energy utilization rate is high.

Figure 4:
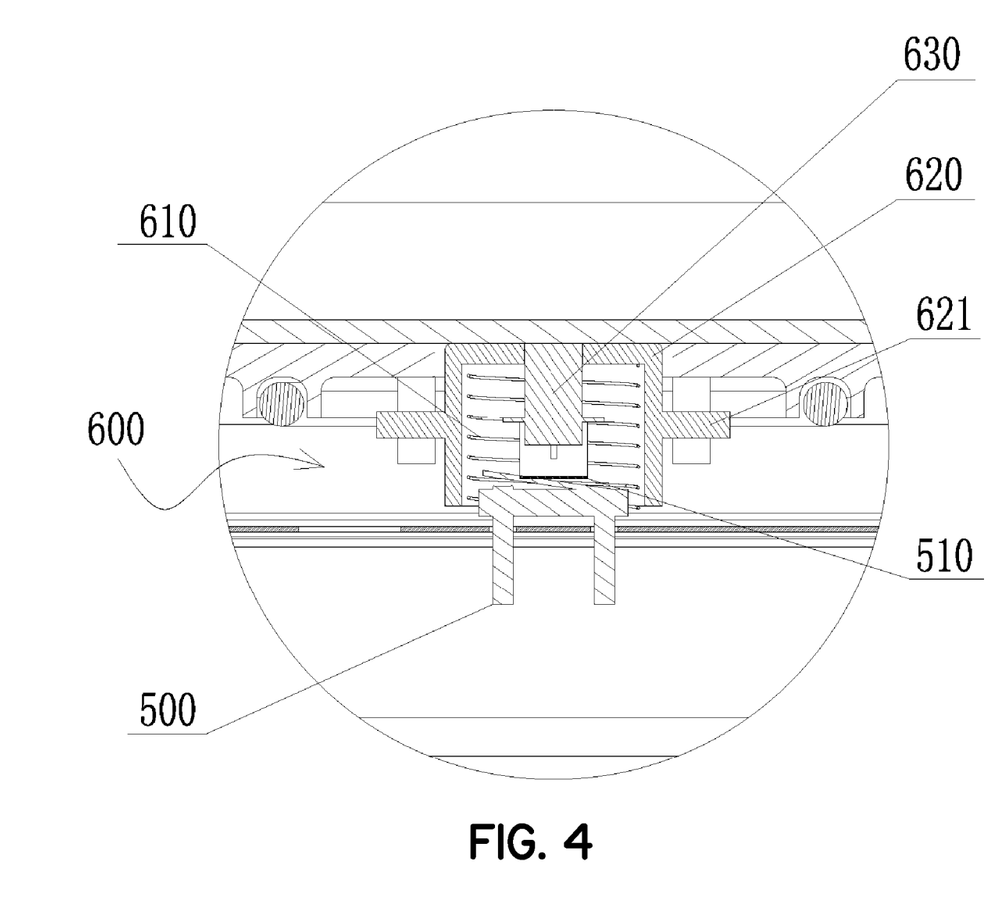
FIG. 4 is a partially enlarged view of cross-sectional detail A of FIG. 1, showing further details of a temperature measurement through hole and safety switch of the multifunctional pot.
Figure 5:
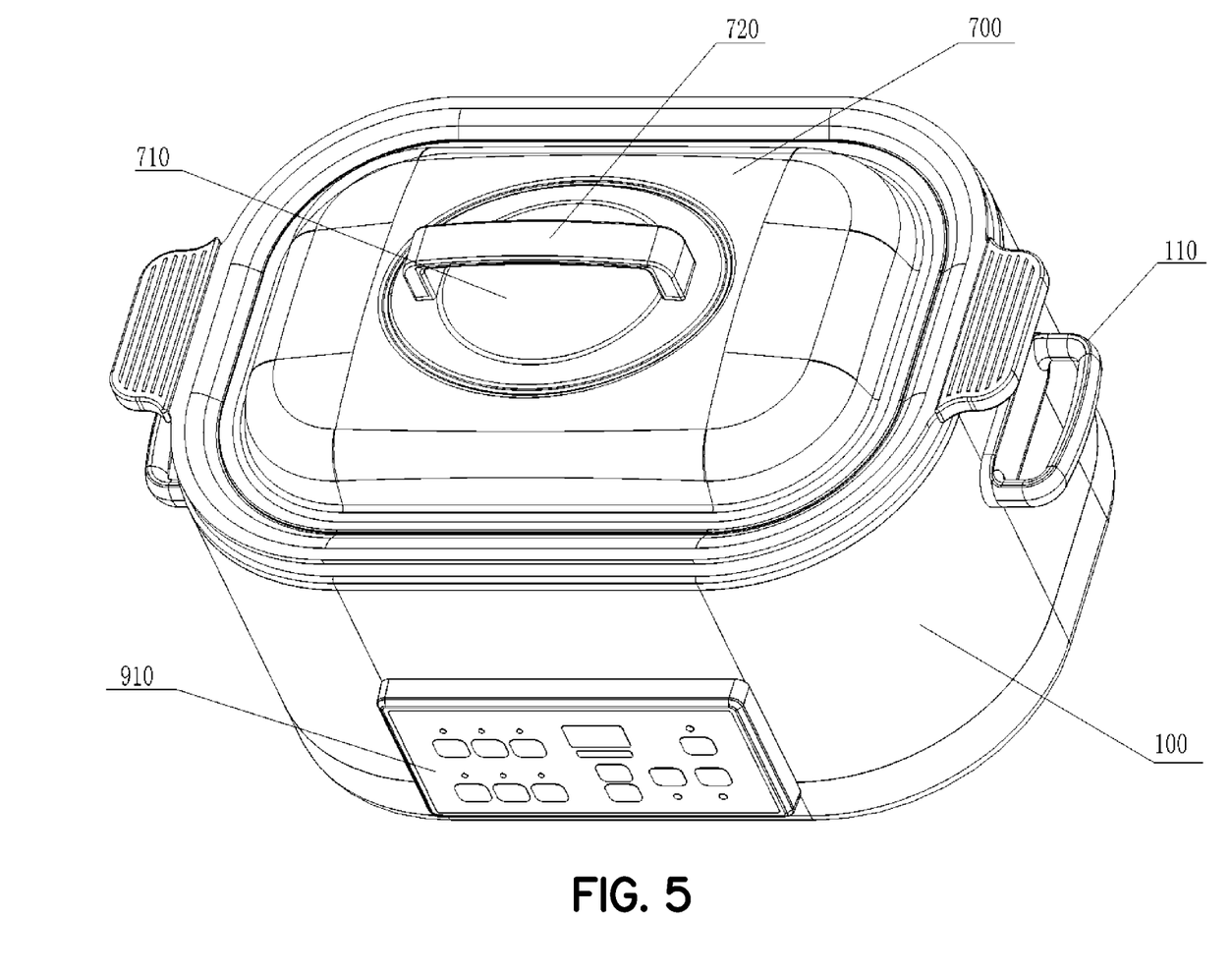
FIG. 5 is a perspective view of the multifunctional pot of FIG. 1.
Figure 7:
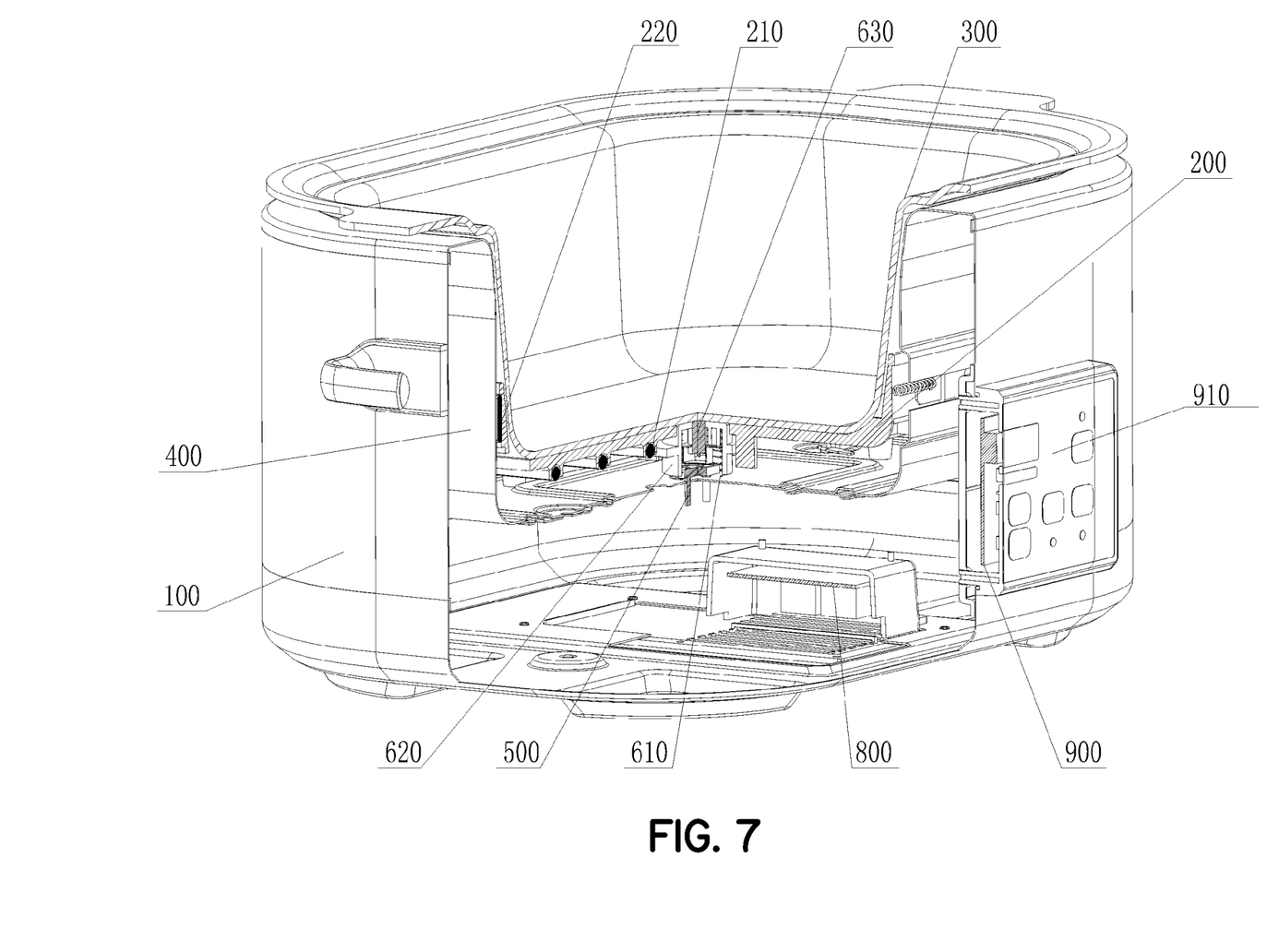
FIG. 7 is a perspective, partially sectioned view of the multifunctional pot of FIG. 1.

In this embodiment, the operating circuit of the multifunctional pot is further electrically connected with a safety switch 500. As shown in FIGS. 1, 4 and 7, the safety switch 500 is connected in series to the bottom heating element 210 and the annular heating element 220 which are connected in parallel.

A temperature measurement device 600 for measuring the temperature of the pot body 300 is provided between the heating element heat-conducting tray 200 and the liner 400. The safety switch 500 is disposed on an inner bottom surface of the liner 400 below the temperature measurement device 600. The temperature measurement device 600 is connected to the inner bottom surface of the liner 400 via an elastic resetting element 610, and an upper end of the temperature measurement device 600 passes through and extends out from the heating element heat-conducting tray 200. When the pot body 300 is placed into the heating element heat-conducting tray 200 and contacts the inner bottom surface of the heating element heat-conducting tray 200, the pot body 300 pushes down the temperature measurement device 600 and moves down the temperature measurement device 600 to contacts the safety switch 500 to turn on the safety switch 500.

In the embodiment shown in the Figures, a temperature measurement through hole is provided on the bottom of the heating element heat-conducting tray 200. The temperature measurement device 600 includes a limiting cover 620. A limiting portion 621 is provided on an outer wall of the limiting cover 620. The elastic resetting element 610 is disposed within the limiting cover 620 and is in a compressed state. An upper end of the elastic resetting element 610 is resisted against an inner top surface of the limiting cover 620, while a lower end thereof is resisted against the inner bottom surface of the liner 400. A thermometer 630 which is located inside the elastic resetting element 610 is fixedly connected within the limiting cover 620. An upper end of the thermometer 630 passes through the limiting cover 620 and can contact the pot body 300. Due to an elastic force of the elastic resetting element 610, the limiting cover 620 passes through the temperature measurement through hole from the underneath of the heating element heat-conducting tray 200. The limiting portion 621 is used for limiting the height of the temperature measurement device 600 extending out from the heating element heat-conducting tray 200, and the limiting portion 621 is unable to pass through the temperature measurement through hole.

In the multifunctional pot in this embodiment, the limiting cover 620 is a bottomless cylindrical housing. The lower end of the elastic resetting element 610 is fixedly connected to the inner bottom surface of the liner 400. The elastic resetting element 610 is a spring, or can be other hollow elastic elements. The limiting portion 621 is a ring-shaped limiting portion arranged in a circumferential direction of the limiting cover 620. The limiting portion 621 is disposed at a middle position in an axial direction of the limiting cover 620. The diameter of the limiting portion 621 is greater than that of the temperature measurement through hole, and the limiting portion 621 is located below the heating element heat-conducting tray 200. When the pot body 300 is not placed into the heating element heat-conducting tray 200, due to the elastic force of the elastic resetting element 610, the limiting cover 620 passes through and extends out from the bottom surface of the heating element heat-conducting tray 200. The limiting portion 621 is clamped outside the temperature measurement through hole on the heating element heat-conducting tray 200, so that the limiting cover 620 is unable to extend out a too large distance from the heating element heat-conducting tray 200, and the limiting cover 620 is prevented from being discharged from the heating element heat-conducting tray 200 by the elastic resetting element 610. When the pot body 300 is placed into the heating element heat-conducting tray 200 and contacts the inner bottom surface of the heating element heat-conducting tray 200, the top of the thermometer 630 contacts the pot body 300, the pot body 300 pushes down the limiting cover 620, and the thermometer 630 moves down along with the limiting cover 620. When the pot body 300 contacts the heating element heat-conducting tray 200, a contact switch iron sheet 510 arranged on the bottom of the thermometer 630 contacts the safety switch 500 so as to turn on the safety switch 500.

Therefore, in the multifunctional pot in this embodiment, only after the pot body 300 is placed into the heating element heat-conducting tray 200, the bottom heating element 210 and the annular heating element 220 can be activated, and the heating element heat-conducting tray 200 can thus be heated. Accordingly, the mis-operation, scalding, short circuit and the like can be effectively avoided, and the safety performance is higher. Meanwhile, since the thermometer 630 in the temperature measurement device 600 can measure the temperature of the pot body 300 in real time, an operator is allowed to adjust the operation state of the bottom heating element 210 and the annular heating element 220 in real time and adjust the heating temperature and the heating time in real time, so that the taste of the food is improved.

In this embodiment, the multifunctional pot has a controller to which the temperature measurement device 600 is communicatively connected. The controller is communicatively connected to the bottom heating element 210 and the annular heating element 220, respectively, and can control the on and off the bottom heating element 210 and the annular heating element 220.

Figure 6:
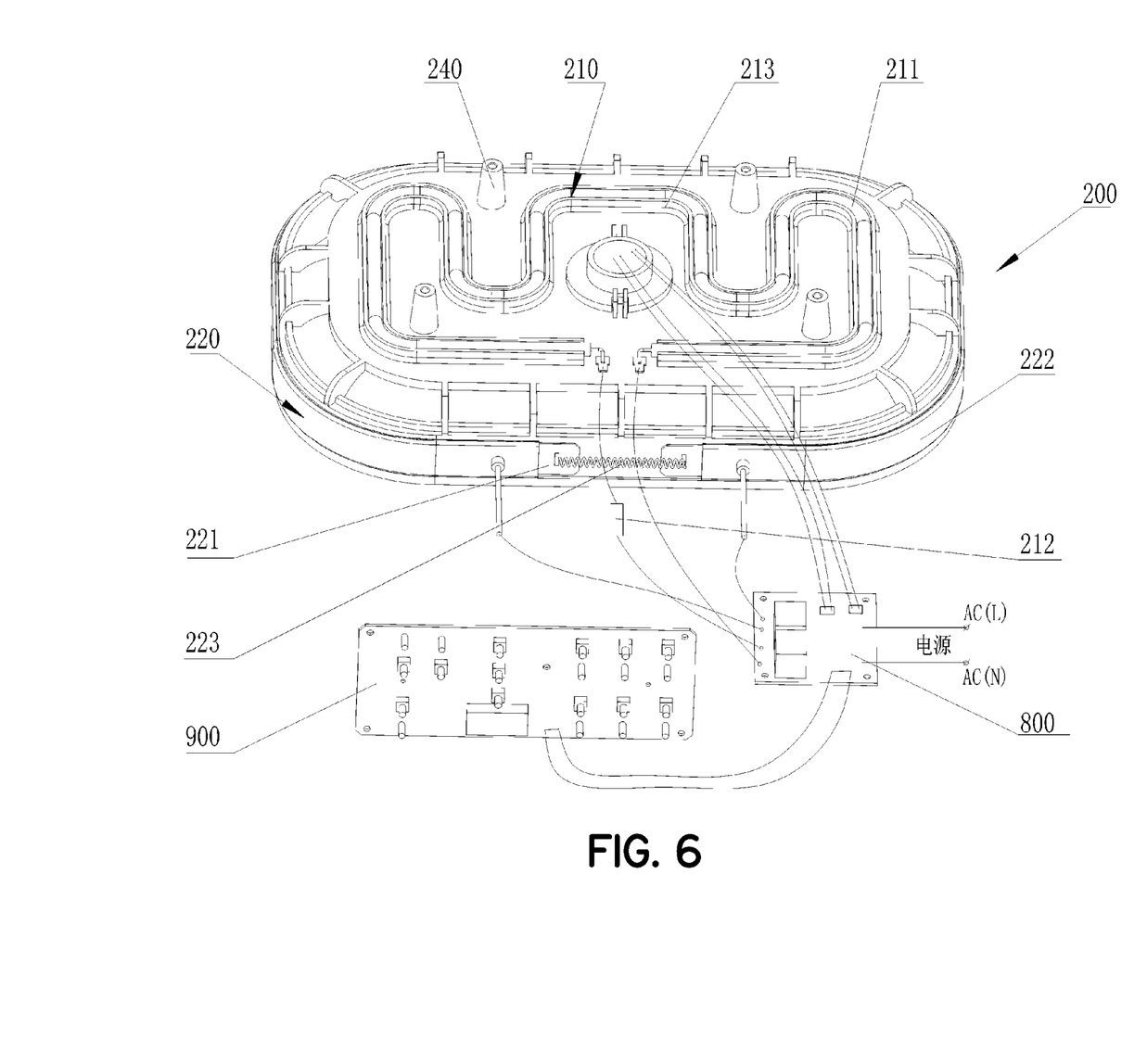
FIG. 6 is a schematic diagram of a heating element heat-conducting tray of the multifunctional pot of FIG. 1.

As shown in FIG. 6, a circumferential groove for accommodating the annular heating element 220 is provided on the outer side wall of the heating element heat-conducting tray 200 in a circumferential direction. The annular heating element 220 includes a heating tape 221. An exposed side wall of the heating tape 221 can be or not be wrapped or cladded by a silicone rubber strip 222, also referred to as a silicone cladding. The silicone rubber strip 222 can effectively protect the heating tape 221 from burning out when encountering water, to play a waterproof role. The heating tape 221 is disposed within the circumferential groove, and two ends of the heating tape 221 are connected via a tension spring 223. The tension spring 223 is in a stretched state, so that the heating tape 221 is tightly wrapped on an outer side wall of the heating element heat-conducting tray 200, and the heat transfer efficiency is thus improved.

The bottom heating element 210 includes a heating tube 211. A middle portion of the heating tube 211 is distributed on the outer bottom surface of the heating element heat-conducting tray 200 in an S-shape, and on a lengthwise side of the heating element heat-conducting tray 200, two ends of the heating tube 211 extend relatively to the middle portion of the heating element heat-conducting tray 200 in the lengthwise direction of the heating element heat-conducting tray 200, so that the heating element heat-conducting tray 200 is heated more evenly and the local overheating will not be caused. In this embodiment, the heating tube 211 is further connected in series to a current limiting resistor 212. The heating tube 211 and the current limiting resistor 212 connected in series are connected to the annular heating element 220 in parallel. A clamping groove 213 matched with the distribution shape of the heating tube 211 is provided on the outer bottom surface of the heating element heat-conducting tray 200. The heating tube 211 is clamped within the clamping groove 213, and the edges of the clamping groove 213 are cold-pressed and fixed by a fixture. A circumferential edge of the bottom of the heating element heat-conducting tray 200 is hollow, so that the weight of the heating element heat-conducting tray 200 can be decreased.

In this embodiment, the multifunctional pot further includes a lid 700. The shape of the lid 700 is matched with an opening of the pot body 300. The lid 700 can be placed at the opening of the pot body 300, and an observation hole is formed on the lid 700. A transparent glass cover 710 for closing and sealing the observation hole is provided on the observation hole. A lid handgrip 720 for conveniently lifting the lid 700 to observe the state of the food being cooked in the pot body 300 is provided on the lid 700. A shell handle 110 convenient for taking up and down the multifunctional pot is provided on a side wall of the shell 100. A handgrip 310 wrapped by a silicone rubber insulating sleeve 311 is externally provided on an upper edge of the pot body 300, so that the scalding can be effectively prevented when taking up and down the pot body 300.

An upper end face of the thermometer 630 is aligned/flush with an upper end face of the limiting cover 620. The pot body 300 is an aluminum pot which can evenly heat the food due to good heat conductivity. The pot body 300 can also be an iron pot or a stainless-steel pot as long as the even heating of the food can be realized. The liner 400 is an aluminum liner or can be made of stainless steel or a cold-rolled sheet coated with high temperature resistant paint. In this way, the rusting of the pot body 300 can be effectively prevented from influencing its service life, and the use of the aluminum liner can reduce the production cost. The heating element heat-conducting tray 200 can be an aluminum or aluminum alloy heat-conducting tray which has good heat conductivity and is heated evenly. The heating element heat-conducting tray can also be made of other metal material. The thermometer 630 is an NTC thermometer. A plurality of struts 240 are provided on the outer bottom surface of the heating element heat-conducting tray 200. The struts 240 support the heating element heat-conducting tray 200 so that a certain distance capable of accommodating the temperature measurement device 600 and the safety switch 500 is reserved between the outer bottom surface of the heating element heat-conducting tray 200 and the inner bottom surface of the liner 400. The struts 240 are connected to the liner 400 via bolts. A certain spacing (e.g., 2 mm to 3 mm) can be provided between the outer side wall of the heating element heat-conducting tray 200 and the inner side wall of the liner 400, so that it is convenient to mount the heating element heat-conducting tray 200.

In the multifunctional pot in this embodiment, as shown in FIG. 7, an opening for allowing leads connecting the bottom heating element 210 and the annular heating element 220 to the operating circuit to pass therethrough is formed on a side wall and/or a bottom surface of the liner 400, so that the bottom heating element 210 and the annular heating element 220 are electrically connected to the operating circuit of the multifunctional pot. As shown in FIG. 6, the bottom heating element 210, the annular heating element 220, the thermometer 630 and the safety switch 500 are all connected to a power panel 800 via leads and then externally connected to a power supply via the power panel 800. The power panel 800 is fixedly mounted within a space between the bottom surface of the shell 100 and the bottom surface of the liner 400 via a fixation seat. Silicone rubber particles are provided on lower end faces of legs on the outer bottom surface of the shell 100, so that the impact on the multifunctional pot during its placement is reduced. The controller includes a control panel 900 which is also electrically connected to the power panel 800. The control panel 900 can control the operation state of the bottom heating element 210 and the annular heating element 220 according to a control command, and can receive information transmitted by the thermometer 630 so that the operation state of the bottom heating element 210 and the annular heating element 220 is controlled in real time according to the real-time temperature of the pot body 300.

The multifunctional pot in this embodiment has frying, stewing, keeping constant temperature and roasting modes for selection. A control panel 900 is provided on the shell 100, and the control panel 900 is electrically connected to an LED screen 910. Corresponding function programs on the control panel 900 are turned on or off through the LED screen 910. The corresponding functions on the LED screen 910 are provided with corresponding keys and corresponding indicators. When a key is pressed down, the function program corresponding to the key will be activated, and the corresponding indicator is lightened; and, when the key is pressed down again, the corresponding function program and the indicator are turned off.

The frying mode can perform stewing, stir-frying or frying, and has three power gears, i.e., high, medium and low. In the low-gear frying mode, other keys are invalid keys; there is no display on the LED screen 910; heating is performed by the bottom heating element 210 alone at full power; and, after the operation is completed, the multifunctional pot is powered off by pressing the key OFF down. In the medium-gear frying mode, other keys are invalid keys; there is no display on the LED screen 910; heating is performed by both the bottom heating element 210 and the annular heating element 220, and the heating is stopped for 15 seconds every 95 seconds; and, after the operation is completed, the multifunctional pot is powered off by pressing the key OFF down. In the high-gear frying mode, other keys are invalid keys; there is no display on the LED screen 910; heating is performed by both the bottom heating element 210 and the annular heating element 220 at full power; and, after the operation is completed, the multifunctional pot is powered off by pressing the key OFF down.

The stewing mode has three power gears, i.e., high temperature, low temperature and temperature preservation. The heating is performed by the annular heating element 220 alone, and the working time at each gear can be preset. By simply selecting a power gear of high temperature or low temperature, all operations can be done well by the stewing function. When the boiling operation is completed, the system will automatically skip to the power gear of temperature preservation. The food will be kept warm after it is boiled. The temperature preservation time is from 30 minutes to 12 hours at most, and is defaulted as 4 hours. In the high temperature stewing mode, the heating is performed by the annular heating element 220 at full power; in the low temperature stewing mode, the heating is performed by the annular heating element 220 and stopped for 15 seconds every 95 seconds; and in the temperature preservation mode, the heating is performed by the annular heating element 220 and stopped for 50 seconds every 35 seconds.

In the roasting mode, meat, bread or cake can be roasted or even steamed. In order to realize the roasting function, a grill which can be placed into the pot body 300 needs to be equipped. At the beginning of the roasting mode, the heating is performed by both the bottom heating element 210 and the annular heating element 220, and the roasting temperature and the operation time can be preset. During the operation, the roasting temperature and time can also be adjusted. The temperature adjustment range is from 250° F. (120° C.) to 425° F. (218° C.), and the adjustment unit is in increments of 25° F. The LED screen 910 can display the real-time temperature of the roasting mode. After the cooking is completed, the multifunctional pot is powered off automatically or by pressing the key OFF down.

In the constant temperature mode, a piece of beefsteak can be boiled. The beefsteak boiled at a constant temperature is more fresh and tender, and tastes better. In the constant temperature mode, the heating is performed by the annular heating element 220 alone, and the heating temperature and time can be preset. The temperature adjustment range is from 122° F. (50° C.) to 212° F. (100° C.), and the adjustment unit is in increments of 25° F. Before the use, the heating temperature and the heating time are preset. When the temperature of the pot body 300 measured by the thermometer 630 is 3° C. to 5° C. higher than the preset temperature, the controller controls the annular heating element 220 to stop working; and, when the temperature of the pot body 300 measured by the thermometer 630 is 3° C. to 5° C. less than the preset temperature, the controller controls the annular heating element 220 to continue working, so that the water temperature in the pot body 300 is kept within a stable range. After the cooking is completed, the multifunctional pot is powered off automatically or by pressing the key OFF down. After the beefsteak is boiled well, water is poured off; and the beefsteak is placed into the pot, added with butter, and fried in the high-gear stir-frying mode.

Although the principle and implementations of the present invention have been described above by specific examples in the present invention, the foregoing description of the embodiments is merely for helping understanding the method and core idea of the present invention. Meanwhile, various alterations to the specific implementations and applications may come to a person of ordinary skill in the art according to the concept of the present invention. In conclusion, the contents of the description shall not be regarded as limitations to the present invention.

What is claimed is:

1. A multifunctional pot, comprising:
a shell, within which a liner is provided, an upper end of the shell being connected to an upper end of the liner;
a heating element heat-conducting tray which is disposed inside the liner, a height of the heating element heat-conducting tray being less than a depth of the liner, a bottom heating element for heating the bottom of the heating element heat-conducting tray being provided on an outer bottom surface of the heating element heat-conducting tray, an annular heating element for heating a side wall of the heating element heat-conducting tray being provided on an outer side wall of the heating element heat-conducting tray, the bottom heating element and the annular heating element being connected in parallel and electrically connected to an operating circuit of the multifunctional pot; and
a pot body for containing food to be cooked, the pot body being placed on the heating element heat-conducting tray, an inner wall of the heating element heat-conducting tray being fitted to an outer wall of the pot body, a height of the pot body being greater than a depth of the heating element heat-conducting tray,
wherein a circumferential groove for accommodating the annular heating element is provided on the outer side wall of the heating element heat-conducting tray in a circumferential direction; the annular heating element comprises a heating tape;
wherein a silicone cladding is cladded outside the heating tape;
wherein the heating tape is disposed within the circumferential groove; and
wherein two ends of the heating tape are connected via a tension spring.

2. The multifunctional pot of claim 1, wherein the operating circuit of the multifunctional pot is further electrically connected with a safety switch, and the safety switch is connected in series to the bottom heating element and the annular heating element which are connected in parallel.

3. The multifunctional pot of claim 2, wherein a temperature measurement device for measuring a temperature of the pot body is provided between the heating element heat-conducting tray and the liner;
the safety switch is disposed an inner bottom surface of the liner below the temperature measurement device;
the temperature measurement device is connected to the inner bottom surface of the liner via an elastic resetting element, and
an upper end of the temperature measurement device passes through and extends into the heating element heat-conducting tray;
when the pot body is placed into the heating element heat-conducting tray and is in contact with the inner bottom surface of the heating element heat-conducting tray, the pot body pushes down the temperature measurement device and moves down the temperature measurement device to contact the safety switch so as to turn on the safety switch.

4. The multifunctional pot of claim 3, wherein a temperature measurement through hole is provided on the bottom of the heating element heat-conducting tray;
the temperature measurement device comprises a limiting cover;
a limiting portion is provided on an outer wall of the limiting cover;
the elastic resetting element is disposed within the limiting cover and in a compressed state;
an upper end of the elastic resetting element is resisted against an inner top surface of the limiting cover, while a lower end thereof is resisted against the inner bottom surface of the liner;
a thermometer which is located inside the elastic resetting element is fixedly connected within the limiting cover;
an upper end of the thermometer passes through the limiting cover and can contact the pot body;
due to an elastic force of the elastic resetting element, the limiting cover passes through the temperature measurement through hole from the underneath of the heating element heat-conducting tray; and
the limiting portion is used for limiting a height of the temperature measurement device extending out from the heating element heat-conducting tray, and the limiting portion is unable to pass through the temperature measurement through hole.

5. The multifunctional pot of claim 4, wherein the safety switch is a contact switch, and a contact switch iron sheet;
when the pot body is placed into the heating element heat-conducting tray and is in contact with the inner bottom surface of the heating element heat-conducting tray, the contact switch iron sheet contacts the safety switch to turn on the safety switch.

6. The multifunctional pot of claim 3, further comprising:
a controller,
wherein the temperature measurement device is communicatively connected to the controller, and the controller is communicatively connected to the bottom heating element and the annular heating element, respectively, and can control the on and off the bottom heating element and the annular heating element.

7. The multifunctional pot of claim 1, wherein the bottom heating element comprises a heating tube;
a middle portion of the heating tube is distributed on the outer bottom surface of the heating element heat-conducting tray in an S-shape;
on one side of a lengthwise direction of the heating element heat-conducting tray, two ends of the heating tube extend relative to each other towards the middle portion of the heating element heat-conducting tray in the lengthwise direction of the heating element heat-conducting tray;
a clamping groove matched with the shape of the heating tube is provided on the outer bottom surface of the heating element heat-conducting tray;
the heating tube is clamped within the clamping groove;
the heating tube is connected in series to a current limiting resistor; and
a circumferential edge of the bottom of the heating element heat-conducting tray is hollow.

8. The multifunctional pot of claim 1, further comprising:
a pot lid,
wherein the shape of the pot lid is matched with an opening of the pot body;
an observation hole is formed on the pot lid;
a transparent glass cover for sealing the observation hole is provided on the observation hole;
a shell handle is provided on a side wall of the shell;
a handgrip is externally provided on an upper edge of the pot body; and
the handgrip is coated with a silicone rubber insulating sleeve.

9. The multifunctional pot of claim 4, wherein an upper end face of the thermometer is aligned with an upper end face of the limiting cover;
- the pot body is an aluminum pot;
- the liner is an aluminum pot;
- the heating element heat-conducting tray is an aluminum alloy heat-conducting tray;
- the thermometer is an NTC thermometer;
- a plurality of struts are provided on the outer bottom surface of the heating element heat-conducting tray; and
- the struts are connected to the liner via bolts.

* * * * *